(12) United States Patent
Heikal et al.

(10) Patent No.: US 12,628,218 B2
(45) Date of Patent: May 12, 2026

(54) CONTROL OF WIRELESS CONNECTIVITY BASED ON LATENCY

(71) Applicant: Charter Communications Operating, LLC, St. Louis, MO (US)

(72) Inventors: Hany A. Heikal, Aurora, CO (US); Hossam H. Hmimy, Aurora, CO (US); Mohamed Daoud, Englewood, CO (US); Conner B. Gesbocker, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 849 days.

(21) Appl. No.: 17/709,855

(22) Filed: Mar. 31, 2022

(65) Prior Publication Data

US 2023/0319919 A1 Oct. 5, 2023

(51) Int. Cl.
*H04W 76/15* (2018.01)
*H04L 43/0864* (2022.01)
*H04W 36/14* (2009.01)
*H04W 36/30* (2009.01)

(52) U.S. Cl.
CPC ......... *H04W 76/15* (2018.02); *H04L 43/0864* (2013.01); *H04W 36/14* (2013.01); *H04W 36/30* (2013.01)

(58) Field of Classification Search
CPC ..... H04W 76/15; H04W 76/19; H04W 36/14; H04W 36/0005; H04W 36/30; H04W 36/302; H04W 36/304; H04L 69/14; H04L 43/0864; H04L 43/0858; H04L 43/0852; H04L 43/087
See application file for complete search history.

(56) References Cited

U.S. PATENT DOCUMENTS

| | | | | |
|---|---|---|---|---|
| 10,602,551 | B2 * | 3/2020 | Beck | H04W 88/06 |
| 2015/0264577 | A1 * | 9/2015 | Yang | H04W 24/08 370/252 |
| 2017/0208540 | A1 | 7/2017 | Egner et al. | |
| 2019/0320328 | A1 | 10/2019 | Magzimof et al. | |

OTHER PUBLICATIONS

International Search Report, PCT/US2023/015754, Jun. 13, 2023, pp. 1-12.

* cited by examiner

*Primary Examiner* — Brian T Le
(74) *Attorney, Agent, or Firm* — Armis IP Law, LLC

(57) ABSTRACT

A communication management resource associated with a mobile communication device establishes wireless connectivity between the mobile communication device and multiple wireless networks. The wireless connectivity includes multiple wireless communication links. The communication management resource determines a respective latency associated with conveyance of communications over the multiple wireless communication links. Based on the respective latencies, the communication management resource or other suitable entity selects a wireless communication link from the multiple wireless communication links in which to support communications between the mobile communication device and a remote management entity.

25 Claims, 10 Drawing Sheets

NETWORK ENVIRONMENT 100

PATHWAY 101

CONTROL OF WIRELESS CONNECTIVITY BASED ON LATENCY

BACKGROUND

In a communication system, the latency is the time it takes to transfer data from one location to another. Wireless technology typically offers an extremely low latency (or delay) between a time that data is sent and a time of receiving that data. Typically, the latency of a wireless network may be from 200 milliseconds for 4G wireless technology and even lower such as 1 millisecond (1 ms) via 5G wireless technology.

One application of wireless technology is vehicular control. For example, a vehicle can be configured to establish connectivity with a remote management resource over a wireless communication link. In such an instance, the vehicle provides information such as its location, speed, etc., over the wireless communication link to the remote management resource. The remote management resource processes the received data and provides control commands to the vehicle based on provided information

BRIEF DESCRIPTION OF EMBODIMENTS

Embodiments herein provide improved implementation of wireless access networks and expand use of limited wireless bandwidth in a network environment.

More specifically, a communication management resource (such as disposed in any suitable entity) establishes wireless connectivity between a mobile communication device and multiple wireless networks; the wireless connectivity includes multiple candidate wireless communication links. The communication management resource determines a respective latency associated with conveyance of communications over the multiple candidate wireless communication links. Based on the respective latencies, the communication management resource or other suitable entity selects a wireless communication link from the multiple candidate wireless communication links to support communications (such as control communications, feedback communications, etc.) between the mobile communication device and a remote management entity.

In one embodiment, the wireless connectivity includes a first wireless communication link and a second wireless communication link. The mobile communication device is in communication with the (remote) management resource via the first wireless communication link between the mobile communication device and the first wireless network; the first wireless communication link supports first communications between the mobile communication device and the management resource. The mobile communication device is in communication with the management resource via a second wireless communication link between the mobile communication device and the second wireless network; the second wireless communication link supports second communications between the mobile communication device and the management resource.

In further example embodiments, when selecting a wireless network, the mobile communication device establishes a first wireless communication link with a first wireless network of the multiple wireless networks; the mobile communication device establishes a second wireless communication link with a second wireless network of the multiple wireless networks. The communication management resource can be configured to determine the latency associated with each of the wireless networks in any suitable manner. For example, in one embodiment, the mobile communication device communicates a first wireless communication from the communication device to the management resource over the first wireless network. The communication management resource generates a first latency value indicating a time difference between the communication device communicating the first wireless communication and the management resource receiving the first wireless communication. The communication management resource communicates a second wireless communication from the communication device to the management resource over the second wireless network. The communication management resource generates a second latency value indicating a time difference between the communication device communicating the second wireless communication and the management resource receiving the second wireless communication. In one embodiment, selection of the wireless communication link from the multiple candidate wireless communication links includes, via the communication management resource or other suitable entity, comparing the first latency value to the second latency value and selecting the second wireless communication link from the multiple wireless communication links for communicating data from the mobile communication device to the remote management entity in response to detecting that a magnitude of the second latency value is less than a magnitude of the first latency value. In other words, the second wireless network provides a lower latency and is more desirable to provide connectivity with the remote management entity.

In still further example embodiments, the communication management resource: i) determines a planned trajectory of travel associated with the mobile communication device through a geographical region; and ii) selects the wireless communication link from the multiple candidate wireless communication links based at least in part on anticipated wireless coverage of the multiple wireless networks and corresponding prior instances of latencies associated with communicating with the remote management entity over the multiple wireless networks along the planned trajectory through a geographical region.

Note further that the techniques as discussed herein can be implemented in any suitable application. In one embodiment, while the mobile communication device travels along a planned travel route through a geographical region, the communication management resource repeats operations of: i) determining a corresponding latency associated with conveyance of communications over the multiple wireless communication links; and ii) based on the corresponding latencies, selecting a wireless communication link from the multiple wireless communication links for communication of data from the mobile communication device to the remote management entity.

In yet further example embodiments, while the mobile communication device is at a first location of a planned travel route of the mobile communication device through a geographical region, the communication management resource communicates data from the mobile communication device over a first selected wireless communication link and through a first wireless network to the remote management entity. While the mobile communication device is at a second location of the planned route, in response to detecting that a second wireless network provides a lower latency than the first wireless network by greater than a threshold value, the communication management resource communicates data from the mobile communication device over a second wireless communication link and through the second wireless network to the remote management entity.

3

In still further example embodiments, each of the multiple wireless networks is operated by a different wireless network service provider.

Yet further embodiments herein include, via the communication management resource or other suitable entity, switching over from communicating data from the mobile communication device over a first wireless network to the remote management entity to communicating data over a second wireless network to the remote management entity in response to detecting that a communication path through the second wireless network to the remote management entity provides a lower latency than the first wireless network.

Note that the communication management resource can be configured to select multiple wireless communication links to support communications with the remote management entity. For example, in one embodiment, the communication management resource selects a group of wireless networks amongst the multiple wireless networks that provide the lowest transmission latency in which to communicate data to the remote management entity. The communication management resource establishes connectivity from the mobile communication device through each of the wireless networks in the group to the remote management entity to provide redundant connectivity if it is deemed to be needed. The redundant paths (lowest latency paths) provided better feedback to the remote management entity and may be useful in geographical regions where accidents most often occur. Certain regions along the respective pathway of the communication device may be more susceptible to dropped communication links. For these regions as well, such as those susceptible to drop communication links, it may be desirable to provide redundant communication paths (lowest latency paths) over multiple different wireless networks between the communication device and the remote management entity.

In further example embodiments, the multiple wireless networks include a first wireless network and a second wireless network. The communication management resource implements hysteresis to determine whether to switchover from using a first wireless communication link established with the first wireless network to using a second wireless communication link established with the second wireless network to communicate with the remote management entity. For example, the communication management resource can be configured to control switchover from using one wireless communication link to another wireless communication link in response to detecting that the second wireless communication link supports a lower latency greater than a threshold amount (such as hysteresis amount).

Embodiments herein are useful over conventional techniques. For example, implementation of a communication management resource and corresponding operations as discussed herein provides one or more ways to provide better wireless connectivity (such as via lower latency communications) between wireless stations in a wireless network environment.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: establish wireless connectivity between a mobile communication device and multiple wireless networks, the wireless connectivity including multiple wireless communication links; determine a respective latency associated with conveyance of communications to a remote management entity over the multiple wireless communication links; and based on the respective latencies, select a wireless communication link from the multiple wireless communication links to support communications between the mobile communication device and the remote management entity. The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
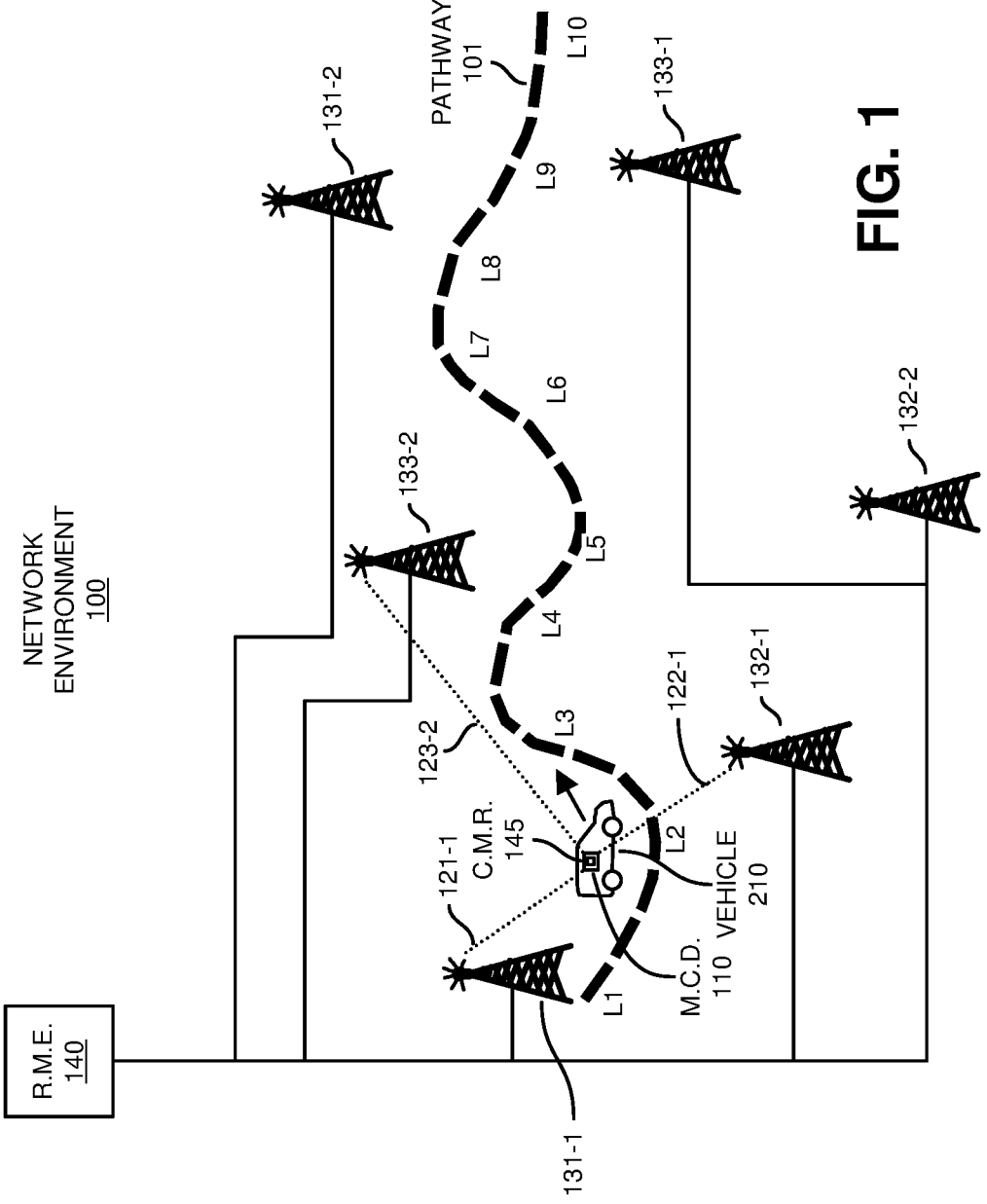
FIG. 1 is an example diagram illustrating a network environment providing a communication device simultaneous connectivity to multiple wireless networks according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

Currently, a self-driving vehicle needs to communicate with a centralized server located on the public internet to send Real-Time Telematics data like Mileage, Fuel level information, fuel consumption information, GPS Location information, Speed, Engine Diagnostics, etc. Typically, communications in a vicinity of roads or highways are covered by multiple mobile networks. There are no guarantees that the vehicle will be connected to a wireless network providing minimum latency to connect to a remote management entity.

As discussed herein, this disclosure provides minimum latency for mobile vehicle connectivity when multiple 5G mobile networks cover the road or the highway.

The proposed solution includes one or more of the following operations/components:

1. A mobile device with multiple SIMs simultaneously connects to multiple mobile networks (4/5G, etc.). In one embodiment, the communication device is integrated with the vehicle and connected to its battery. For simplicity, let's assume the device can connect to three different networks at the same time.

2. Embodiments herein include a new software program installed and executed on that mobile device.

a. The software (such as a communication management resource) executes at a specific interval to check for a lowest latency network. This interval will be configurable. For example, every minute in the background sends three ping commands over the three different mobile wireless networks to a well-established destination server (remote management entity) on the public cloud over the internet.

b. The server (remote management entity) is responsible for collecting the Real-Time Telematics data like Mileage, Fuel, GPS Location, Speed, and Engine Diagnostics.

c. The communication management resource on the mobile communication device executes an algorithm to compare latencies for the three ping responses.

d. Suppose the minimum latency is received from another network compared to the current network one used to be the mobile at that moment. In that case, the communication management resource orders the mobile communication device to hand over to another network with the minimum latency.

e. If the current network used by the mobile communication device has the minimum latency, then the mobile communication device will keep using this network. No handover is needed at this time.

f. If the mobile's current network has a latency equal to other latency received from another network (s), then the mobile will keep using the current network. No handover is needed at this time. This scenario may rarely happen.

g. Suppose the current network used by the mobile has a latency higher than the one received from other networks (s), and the latency from other networks happened to be equal. In that case, the mobile communication device will be handed over to any one of these other networks.

3. The communication management resource stores latency information in conjunction with geolocation (longitude/latitude) on the vendor's centralized server (remote management entity).

4. The information will be shared with other vehicles to expedite the handover process.

5. The other vehicles which use the shared low latency route will run a sporadic ping activity to update the centralized database if there is a discrepancy in the data.

As mentioned above, 5G specifies a 0.5 ms air latency (1 ms Round-Trip Time RTT) between the client and the Radio Access Network (RAN). However, it noted that this solution addresses the end-to-end communication between the device on the vehicle and the centralized server on the cloud over the public internet.

Another point to note is that this solution also works with hybrid networks. Hybrid means the network which combines both 4G and 5G networks.

In contrast to conventional techniques, as further discussed herein, a communication management resource associated with a mobile communication device on a vehicle establishes wireless connectivity between the mobile communication device and multiple wireless networks. The wireless connectivity to the multiple wireless networks includes multiple wireless communication links. The communication management resource determines a respective latency associated with conveyance of communications over each of the multiple wireless communication links. Based on the respective latencies, the communication management resource or other suitable entity selects a wireless communication link from the multiple candidate wireless communication links in which to support communications between the mobile communication device and a remote management entity.

FIG. 1 is an example diagram illustrating a network environment supporting simultaneous connectivity to multiple wireless networks access according to embodiments herein.

As shown in FIG. 1, the network environment 100 includes remote management entity 140, vehicle 210, and pathway 101. The network environment 100 further includes a mobile communication device 110 disposed in the vehicle 210. The mobile communication device 110 executes a communication management resource 145 to perform various functions as discussed herein.

Vehicle 210 (such as unmanned vehicle, computer controlled vehicle, remote controlled vehicle, etc.) travels long pathway 101 (such as road, highway, etc.) from location L1 to a desired destination such as location L10.

In one embodiment, the combination of the remote management entity 140 and the mobile communication device 110 controls operation such as movement of the vehicle 210 along a planned trajectory such as pathway 101.

Note that each of the components in network 100 can be implemented in any suitable manner. For example, a communication management resource 145 associated with or executed by the mobile communication device 110 in vehicle 210 can be implemented as communication management hardware, communication management software, or a combination of communication management hardware and communication management software. The remote management entity 140 can be implemented as remote management hardware, remote management software, or a combination of remote management hardware and remote management software.

As previously discussed, in contrast to conventional techniques, the communication management resource 145 associated with the mobile communication device 110 can be configured to establish wireless connectivity between the mobile communication device 110 and each of multiple wireless networks as the vehicle 210 and corresponding mobile communication device 110 travel along the pathway 101.

For example, while at location L2, the communication management resource 145 establishes wireless communication link 121-1 between the mobile communication device 110 and the wireless base station 131-1 (such as associated with a first wireless network 131). The communication management resource 145 establishes wireless communication link 122-1 between the mobile communication device 110 and the wireless base station 132-1 (such as associated with a second wireless network 132). The communication management resource 145 establishes wireless communication link 123-2 between the mobile communication device 110 and the wireless base station 133-2 (such as associated with a third wireless network 133). Each of these links may be temporary.

Thus, the wireless connectivity includes multiple wireless communication links. As further discussed herein, the communication management resource 145 or other suitable entity connects to different wireless base stations as the vehicle 210 travels along the pathway 101. For example, when the vehicle 210 resides at location L3, the mobile communication device 110 potentially connects to different wireless base stations in each of the multiple wireless networks 131, 132, 133, etc.; when the vehicle 210 resides at location L4, the mobile communication device 110 potentially connects to different wireless base stations in each of the multiple wireless networks 131, 132, 133, etc.; and so on.

In one embodiment, each of the multiple wireless networks 131, 132, 133, etc., is operated by a different wireless network service provider supported by different SIM information.

In further example embodiments, the communication management resource 145 selects a group of wireless networks amongst the available multiple wireless networks that provide the lowest transmission latency in which to communicate data to the remote management entity 140. In such an instance, the mobile communication device 110 establishes connectivity from the mobile communication device through each of the wireless networks in the group of selected wireless networks to the remote management entity 140 and conveys data over established communication paths associated with those sled networks.

During operation, in order to choose a respective one or more wireless communication links to communicate with the remote management entity 140, the communication management resource 145 determines a respective latency associated with conveyance of communications over each of the multiple candidate wireless communication links and/or communication paths between the mobile communication device 110 and the remote management entity 140.

Note that the latency for a respective wireless communication link can be measured in any suitable manner. For example, the measurement of latency can be or include the delay time between transmitting a communication (such as a ping) from the mobile communication device 110 and a time in which the remote management entity 140 receives the transmitted communication (ping). Additionally, or alternatively, measurement of latency can be or include the delay time between the remote management entity 140 transmitting a communication and the mobile communication device 110 receiving the transmitted communication.

The measurement of latency can be or include the delay time between transmitting a communication (such as a ping) from the mobile communication device 110 and a time in which the corresponding candidate wireless base station (wireless network) receives the transmitted communication (ping). Additionally, or alternatively, measurement of latency can be or include the delay time between the candidate wireless base station transmitting a communication and the mobile communication device 110 receiving the transmitted communication.

In further example embodiments, the respective latency associated with a wireless communication link may depend upon a round-trip time of the communication management resource 145 transmitting a communication (such as a ping) over a candidate wireless communication link to the remote management entity 140 and a time in which the communication management resource 145 receives a respective response communication (such as ping response) transmitted from the remote management entity 140.

Based on the respective measured latency associated with each of the communication links, the communication management resource 145 or other suitable entity selects one or more of the wireless communication links to receive data from the remote management entity 140 and/or transmit data from the mobile communication device 110 to the remote management entity 140.

Note that the data conveyed between the remote management entity 140 and the mobile communication device 110 can include any suitable information.

For example, in one embodiment, a combination of the communication management resource 145 and the remote management entity 140 controls motion of the vehicle 210 (such as an unmanned vehicle) along pathway 101. The vehicle 210 can be configured to include one or more sensors associated with operation of the vehicle 210 such as speed, proximity of the vehicle 210 with respect to other vehicles traveling along the pathway 101, proximity of stationary objects disposed in a vicinity of the pathway 101, presence of animals or objects or potholes detected along the pathway 101, current direction of travel of the vehicle 210, maintenance information associated with the vehicle 210, current location of the vehicle 210 along the pathway 101, current location of the vehicle 210 in the corresponding geographical region of network environment 100, etc.

In one embodiment, based on processing of the information received from the mobile communication device 110, the remote management entity 140 communicates control information to the communication management resource 145 via communications through a primary selected wireless base station and corresponding wireless communication link (such as a wireless communication link and wireless network providing lowest latency and highest reliable communications between the mobile communication device 110 and the remote management entity 140).

The remote management entity 140 repeatedly monitors operations of the vehicle 210 along the pathway 101. If the remote management entity 140 determines that the vehicle 210 is not following a proper travel plan or encounters a dangerous situation based on feedback from the mobile communication device 110 or other suitable entity, the remote entity 140 transmits control communications to the mobile communication device 110 to steer the vehicle 210 to a safe location and further halt operation of the vehicle 210.

In one embodiment, the communication management resource 145 of the vehicle 210 needs to receive respective heartbeat messages from the remote management entity 140 within a heartbeat timeframe in order to continue with movement of the vehicle on the pathway 101 to a respective destination.

In accordance with further example embodiments, the communication management resource 145 or other suitable entity can be configured to select a first wireless network to support uplink communications from the communication management resource 145 to the remote management entity supporting the lowest latency communications in the uplink direction from the communication management resource 145 to the remote management entity 140. As previously discussed, the system herein can be configured to monitor a latency of communicating from the remote management entity 140 to the mobile communication device 110. The communication management resource 145 or other suitable entity such as the remote management entity 140 can be configured to select a second wireless network to support downlink communications from the remote management entity 140 to communication management resource 145 supporting the lowest latency communications in the downlink direction from the remote management entity 140 to the mobile communication device 110.

Figure 2:
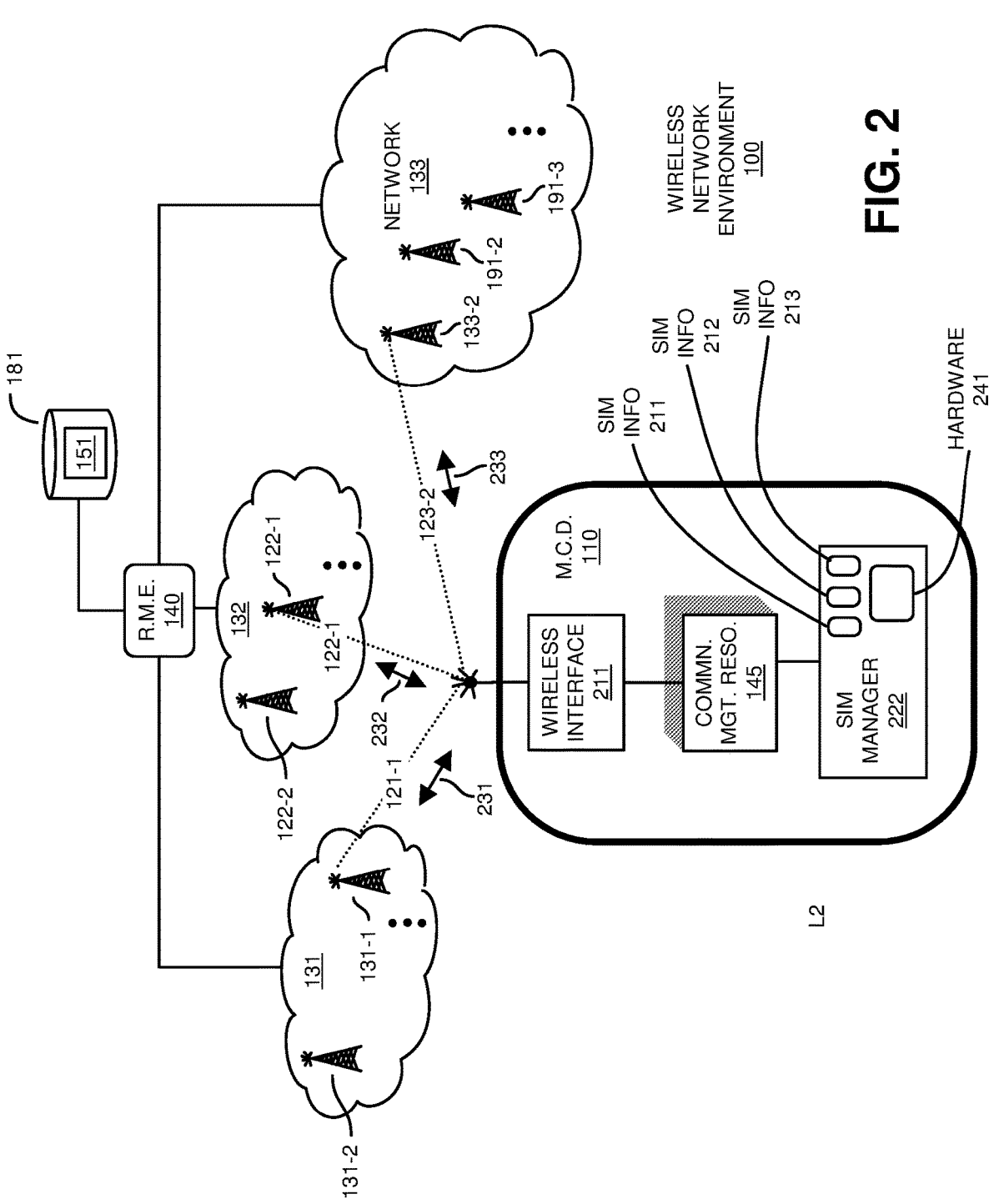
FIG. 2 is an example diagram illustrating details of a mobile communication device and connectivity to multiple wireless networks according to embodiments herein.

FIG. 2 is an example diagram illustrating details of a mobile communication device and connectivity to multiple wireless networks according to embodiments herein.

As shown, the mobile communication device 110 includes wireless interface 211, communication management resource 145, and SIM manager 222.

As its name suggests, the SIM (Subscriber Identity Module) manager 222 manages SIM information associated with the mobile communication device 110. For example, assume that the operator associated with the mobile communication device 110 subscribes to use of multiple different wireless networks in the network environment 100.

In one embodiment, each instance of SIM information enables the mobile communication device use of a corresponding wireless network. More specifically, the SIM information 211 enables the mobile communication device 110 to communicate with wireless base stations disposed in the wireless network 131; the SIM information 212 enables the mobile communication device 110 to communicate with wireless base stations disposed in the wireless network 132; the SIM information 213 enables the mobile communication device 110 to communicate with wireless base stations disposed in the wireless network 133; and so on.

Each of the wireless networks provide connectivity to the remote management entity 140.

Thus, the mobile communication device 110 is provided access to multiple different wireless networks via different SIM information.

As further shown, wireless network 131 includes wireless base station 131-1, wireless base station 131-2, etc. As previously discussed, the wireless base stations 131-1, 131-2, etc., are disposed along the pathway 101 at different locations to provide one or more communication devices at different locations access to the remote management entity 140.

Wireless network 132 includes wireless base station 132-1, wireless base station 132-2, etc. As previously discussed, the wireless base stations 132-1, 132-2, etc., are disposed along the pathway 101 at different locations to provide one or more communication devices at different locations access to the remote management entity 140.

Wireless network 133 includes wireless base station 133-1, wireless base station 133-2, wireless base station 133-3, etc. As previously discussed, the wireless base stations 133-1, 133-2, etc., are disposed along the pathway 101 at different locations to provide one or more communication devices at different locations access to the remote management entity 140.

Thus, while at location L2, during link latency testing, the mobile communication device 110 is in communication with the remote management entity 140 via the first wireless communication link 121-1 between the mobile communication device 110 and the first wireless network 131; the first wireless communication link 121-1 supports first communications between the mobile communication device 110 and the remote management entity 140. The mobile communication device 110 is in communication with the remote management entity 140 via a second wireless communication link 122-1 between the mobile communication device 110 and the second wireless network 132; the second wireless communication link 122-1 supports second communications between the mobile communication device and the remote management entity 140. The mobile communication device 110 is in communication with the remote management entity 140 via a third wireless communication link 123-2 between the mobile communication device 110 and the wireless network 133; the wireless communication link 123-2 supports third communications between the mobile communication device 110 and the remote management entity 140.

As previously discussed, the communication management resource 145 or other suitable entity selects amongst multiple possible wireless networks 131, 132, 133, etc., which provide wireless connectivity to the remote management entity 140 depending upon a corresponding measured latency associated with the wireless communication links 121-1, 122-1, and 123-2, thus providing connectivity of the mobile communication device 110 to the remote management entity 140.

Figure 3:
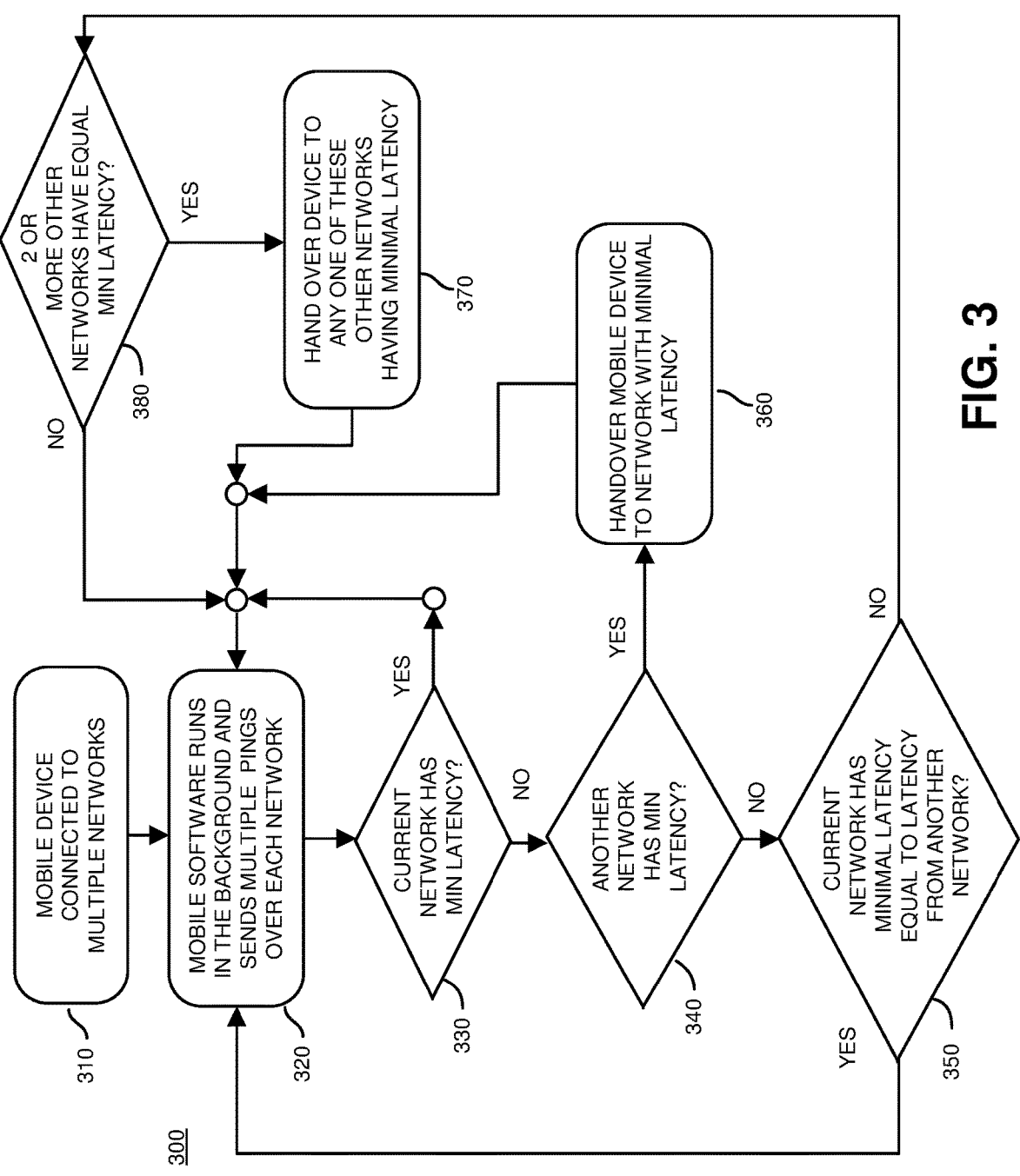
FIG. 3 is an example flow chart illustrating control of wireless link handoffs in a wireless network environment based upon latency measurements of different wireless networks according to embodiments herein.

FIG. 3 is an example flow chart illustrating control of wireless link handoffs in a wireless network environment based upon latency measurements to different wireless networks according to embodiments herein.

Initially, at processing operation 310, the communication management resource 145 operates the mobile communication device 110 to wirelessly connect to multiple wireless networks during latency testing.

Note that the mobile communication device 110 can be configured to learn of presence of the wireless networks in any suitable manner. In one embodiment, the wireless base stations in each of the wireless networks communicates a corresponding beacon indicating its identity and corresponding wireless network to which it belongs. The mobile communication device 110 receives these beacons and can be configured to measure a wireless power level receiving such communications and decide amongst the different wireless base stations to which it will establish a respective wireless communication link. The mobile communication device 110 can be configured to select one or more of the wireless networks and corresponding wireless base stations from which one or more strongest wireless signals are received.

In processing operation 320, the mobile communication device executes communication management resource 145. The communication management resource 145 communicates pings over each of the candidate wireless communication links to test latency.

In processing operation 330, the communication management resource 145 determines if the current selected wireless network supporting a corresponding primary wireless communication link to the remote management entity 140 provides the lowest latency. If so, processing continues at (loops back to) operation 320. Alternatively, if the communication management resource 145 determines that the current selected network and corresponding wireless communication link does not provide the minimum latency, the communication management resource executes operation 340.

In processing operation 340, the communication management resource 145 determines if another wireless network provides a lower latency to the mobile communication device 110 than the currently selected wireless network. If so, the communication management resource 145 initiates a handoff of the mobile communication device to the network providing the lowest latency in processing operation 360.

Alternatively, if the communication management resource 145 in processing operation 340 determines that no other network provides a lower latency than the currently selected network, the communication management resource 145 executes processing operation 350.

In processing operation 350, the communication management resource 145 determines if the current selected network has a minimal latency equal to a latency from another network. If so, the communication management resource 145 continues with processing operation 320 and continues to use the current selected network to communicate with the remote management entity 140. Alternatively, if the current selected network does not have a minimal latency equal to latency of another network, the communication management resource executes processing operation 380.

In processing operation 380, the communication management resource 145 determines if 2 or more other networks have equal minimum latency. If not, the communication management resource reverts (loops) to executing processing operation 320 again. Alternatively, the communication management resource 145 determines at processing operation 380 that two a more other networks have equal minimum latency. In response to this latter condition, the communication management resource 145 executes processing operation 370.

In processing operation 370, the communication management resource 145 hands over the mobile communication device 110 to any of the other wireless networks providing a minimal latency.

Thus, via execution of flowchart 300, while the mobile communication device 110 travels along a planned travel route such as pathway 101 through a geographical region, the communication management resource 145 or other suitable entity repeats operations of: i) determining a corresponding latency associated with conveyance of communications over multiple candidate wireless communication links associated with multiple nearby wireless base stations; and ii) based on the corresponding measured latencies, selects a wireless communication link from the multiple wireless communication links for communication of data from the mobile communication device 110 to the remote management entity 140.

Figure 4:
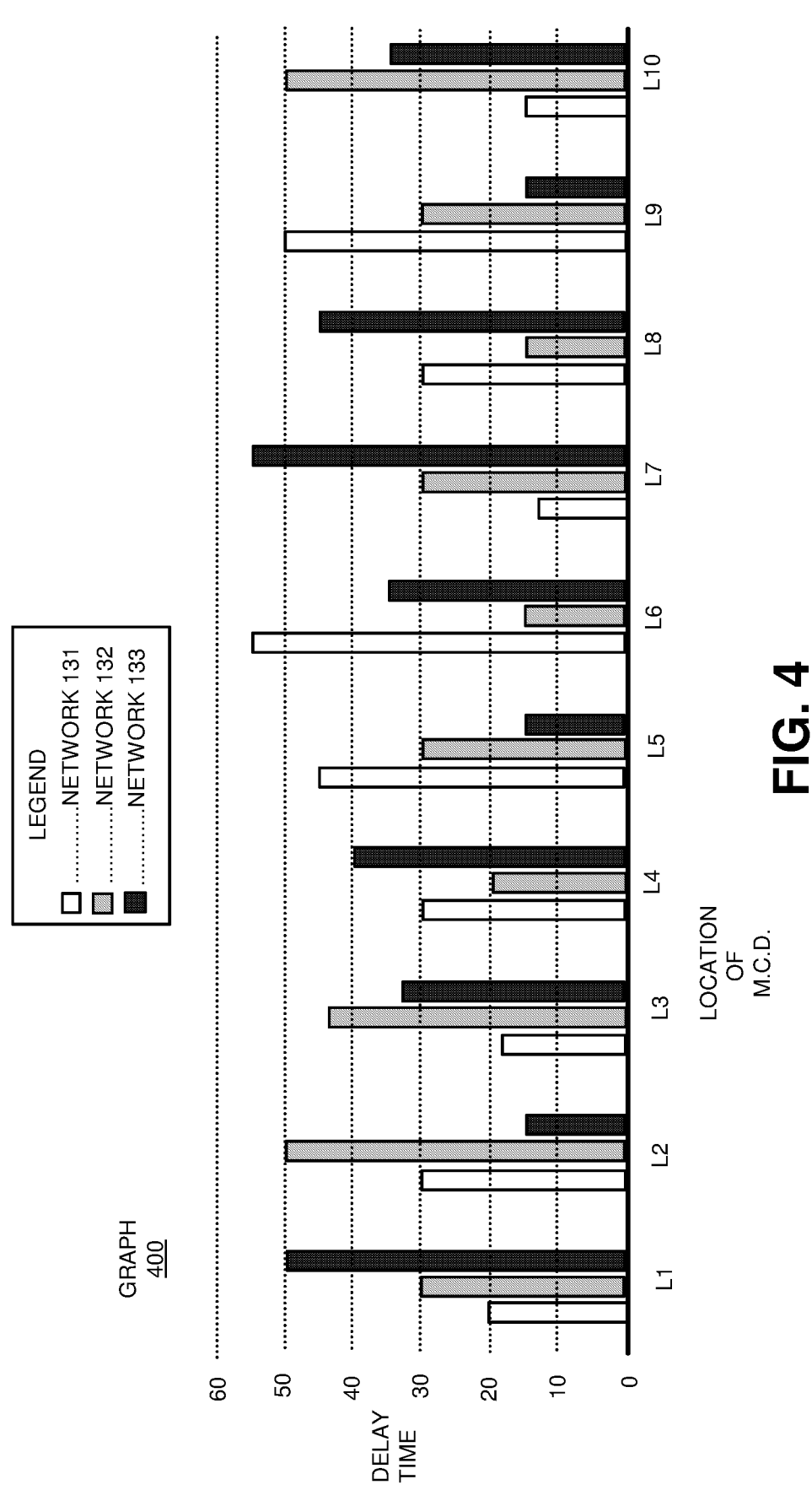
FIG. 4 is an example diagram illustrating latency of communicating data between a mobile communication device at multiple different locations and a remote management entity in the network environment according to embodiments herein.

FIG. 4 is an example diagram illustrating latency of communicating data between a mobile communication device at multiple different locations and a remote management entity in the network environment according to embodiments herein.

As shown in FIG. 4, the communication management resource 145 or other suitable entity determines a lowest latency for each of the multiple available wireless networks at each of the different locations along the pathway 101. For example, while at location L1, the communication management resource 145: i) communicates a first wireless communication from the communication device to the remote management entity over the first wireless network 131; ii) generates a first latency value (20 milliseconds) indicating a first time difference between the communication device 110 communicating the first wireless communication and the remote management entity receiving the first wireless communication; iii) communicates a second wireless communication from the communication device 110 to the remote management entity 140 over the second wireless network 132; iv) generates a second latency value (30 milliseconds) indicating a second time difference between the communication device communicating the second wireless communication and the remote management entity receiving the second wireless communication; v) communicates a third wireless communication from the communication device to the remote management entity over the third wireless network 133; vi) generates a third latency value (50 milliseconds) indicating a third time difference between the communication device communicating the third wireless communication and the remote management entity receiving the second wireless communication.

While at location L1, the communication management resource uses the generated latency values to select the respective wireless network in which to establish connectivity with the remote management entity 140. For example, the communication management resource 145 compares the first latency value, the second latency value, and the third latency value. The communication management resource 145 or other suitable entity selects the first wireless network 131 and corresponding wireless communication link to support communications between the communication device 110 and the remote management entity 145 because it provides the lowest latency of 20 milliseconds, which is lower than the latency of 30 milliseconds provided by the second wireless network 132 or 50 milliseconds provided by the third wireless network 133.

The communication management resource 145 repeats these operations as it travels along the pathway 101 through a geographical region. For example, the communication management resource 145 or other suitable entity initiates switchover from communicating data from the mobile communication device 110 over a first wireless network 131 to the remote management entity to communicating data over a third wireless network 133 to the remote management entity 140 in response to detecting that a communication path through the wireless network 133 to the remote management entity 140 provides a lower latency than the first wireless network 131.

More specifically, while at location L2, the communication management resource 145: i) communicates a first wireless communication from the communication device to the remote management entity 140 over the first wireless network 131; ii) generates a first latency value (30 milliseconds) indicating a time difference between the communication device 110 communicating the first wireless communication and the remote management entity receiving the first wireless communication; iii) communicates a second wireless communication from the communication device 110 to the remote management entity 140 over the second wireless network 132; iv) generates a second latency value (50 milliseconds) indicating a second time difference between the communication device communicating the second wireless communication and the remote management entity 140 receiving the second wireless communication; v) communicates a third wireless communication from the communication device to the remote management entity 140 over the third wireless network 133; vi) generates a third latency value (15 milliseconds) indicating a time difference between the communication device communicating the third wireless communication and the remote management entity receiving the third wireless communication.

While at location L2, the communication management resource uses the generated latency values to select the respective wireless network in which to establish connectivity with the remote management entity 140. For example, the communication management resource 145 compares the first latency value, the second latency value, and the third latency value associated with location L2. The communication management resource 145 or other suitable entity selects the third wireless network 133 and corresponding wireless communication link to support communications between the communication device 110 (at location L2) and the remote management entity 145 because it provides the lowest latency of 15 milliseconds, which is lower than the latency of 30 milliseconds provided by the first wireless network 133 or 50 milliseconds provided by the second wireless network 132.

While at location L3, the communication management resource 145: i) communicates a first wireless communication from the communication device to the remote management entity 140 over the first wireless network 131; ii) generates a first latency value (18 milliseconds) indicating a time difference between the communication device 110 communicating the first wireless communication and the remote management entity receiving the first wireless communication; iii) communicates a second wireless communication from the communication device 110 to the remote management entity 140 over the second wireless network 132; iv) generates a second latency value (43 milliseconds) indicating a second time difference between the communication device communicating the second wireless communication and the remote management entity 140 receiving the second wireless communication; v) communicates a third wireless communication from the communication device to the remote management entity 140 over the third wireless network 133; vi) generates a third latency value (32 milliseconds) indicating a time difference between the communication device communicating the third wireless communication and the remote management entity receiving the third wireless communication.

While at location L3, the communication management resource uses the generated latency values to select the respective wireless network in which to establish connectivity with the remote management entity 140. For example, the communication management resource 145 compares the first latency value, the second latency value, and the third latency value associated with location L3. The communication management resource 145 or other suitable entity selects the first wireless network 131 and corresponding wireless communication link to support communications between the communication device 110 (at location L3) and the remote management entity 145 because it provides the lowest latency of 18 milliseconds, which is lower than the latency of 43 milliseconds provided by the second wireless network 132 or 32 milliseconds provided by the third wireless network 133.

In a similar manner, the communication management resource 145 repeatedly checks for lowest latency as it moves along the pathway 101. The time interval of performing the testing of latency can be based on time, an amount of distance traveled by the vehicle 210, etc. The time interval of testing each of the wireless networks and selection of a wireless network having lowest latency can be shortened in response to detecting an area where the wireless networks are historically and sporadically unreliable.

Figure 5:
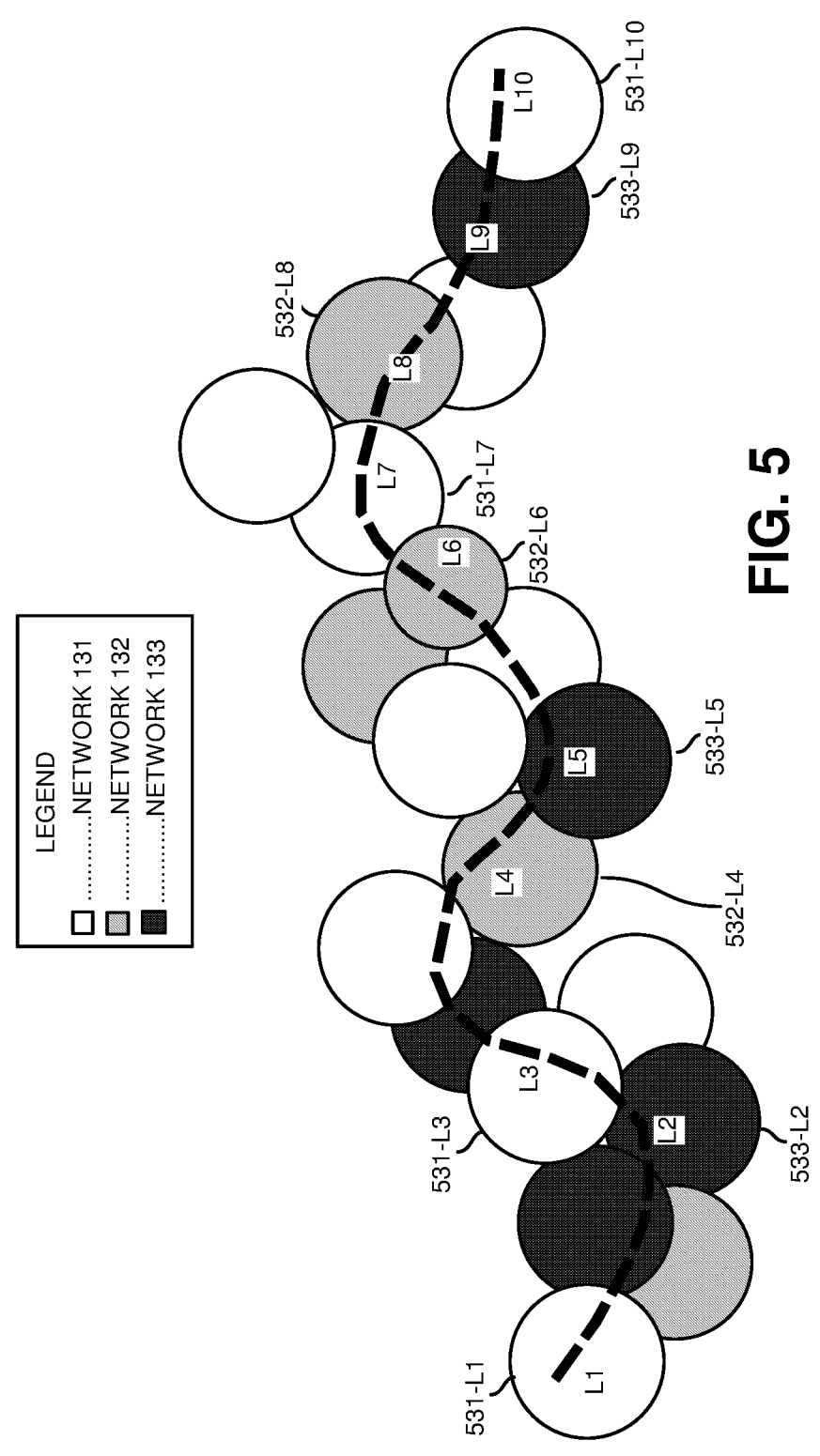
FIG. 5 is an example diagram illustrating wireless coverage and corresponding lowest latency provided by multiple different wireless networks along a respective travel path according to embodiments herein.

FIG. 5 is an example diagram illustrating wireless coverage and corresponding lowest latency provided by multiple different wireless networks along a respective travel path according to embodiments herein.

As shown in FIG. 5, the wireless network providing the lowest latency communications to the remote management entity 140 varies along the respective pathway 101.

For example, at location L1 of the pathway 101, via region of wireless coverage 531-L1, one or more wireless base station in wireless network 131 provide the mobile communication device 110 lowest latency communications between the remote management entity 140; at location L2 of the pathway 101, via region of wireless coverage 533-L2, one or more wireless base station in wireless network 133 provide the mobile communication device 110 lowest latency communications between (to/from) the remote management entity 140; at location L3 of the pathway 101, via region of wireless coverage 531-L3, one or more wireless base station in wireless network 131 provide the mobile communication device 110 lowest latency communications to/from the remote management entity 140; at location L4 of the pathway 101, via region of wireless coverage 522-L4, one or more wireless base station in wireless network 132 provide the mobile communication device 110 lowest latency communications to/from the remote management entity 140; at location L5 of the pathway 101, via region of wireless coverage 533-L5, one or more wireless base station in wireless network 133 provide the mobile communication device 110 lowest latency communications to/from the remote management entity 140; at location L6 of the pathway 101, via region of wireless coverage 532-L6, one or more wireless base station in wireless network 132 provide the mobile communication device 110 lowest latency communications to/from the remote management entity 140; at location L7 of the pathway 101, via region of wireless coverage 531-L7, one or more wireless base station in wireless network 131 provide the mobile communication device 110 lowest latency communications to/from the remote management entity 140; and so on.

As previously discussed, the wireless network providing the lowest latency can be determined in real time as the mobile communication device 110 travels along the pathway 101. However, in further example embodiments, the wireless network providing the most latency can be determined based on a prior history of tracking which wireless networks along the pathway 101 provide the most latency.

In one embodiment, the communication management resource 145 or other suitable entity can be configured to track which of the wireless networks provides the lowest latency based on a history of traveling along pathway 101.

In further example embodiments, the communication management resource 145 or other suitable entity determines a planned trajectory of travel (such as pathway 101) associated with the mobile communication device 110 through a geographical region. The communication management resource 145 selects a respective wireless communication link as a primary link to communicate with the remote management entity 140 from multiple candidate wireless communication links based at least in part on anticipated wireless coverage of the multiple wireless networks and corresponding prior instances of latencies associated with communicating with the remote management entity 140 over the multiple wireless networks along the planned trajectory through the geographical region. Additionally, or alternatively, the communication management resource 140 and/or remote management entity performs real time analysis to select the one or more wireless networks to provide connectivity.

Figure 6:
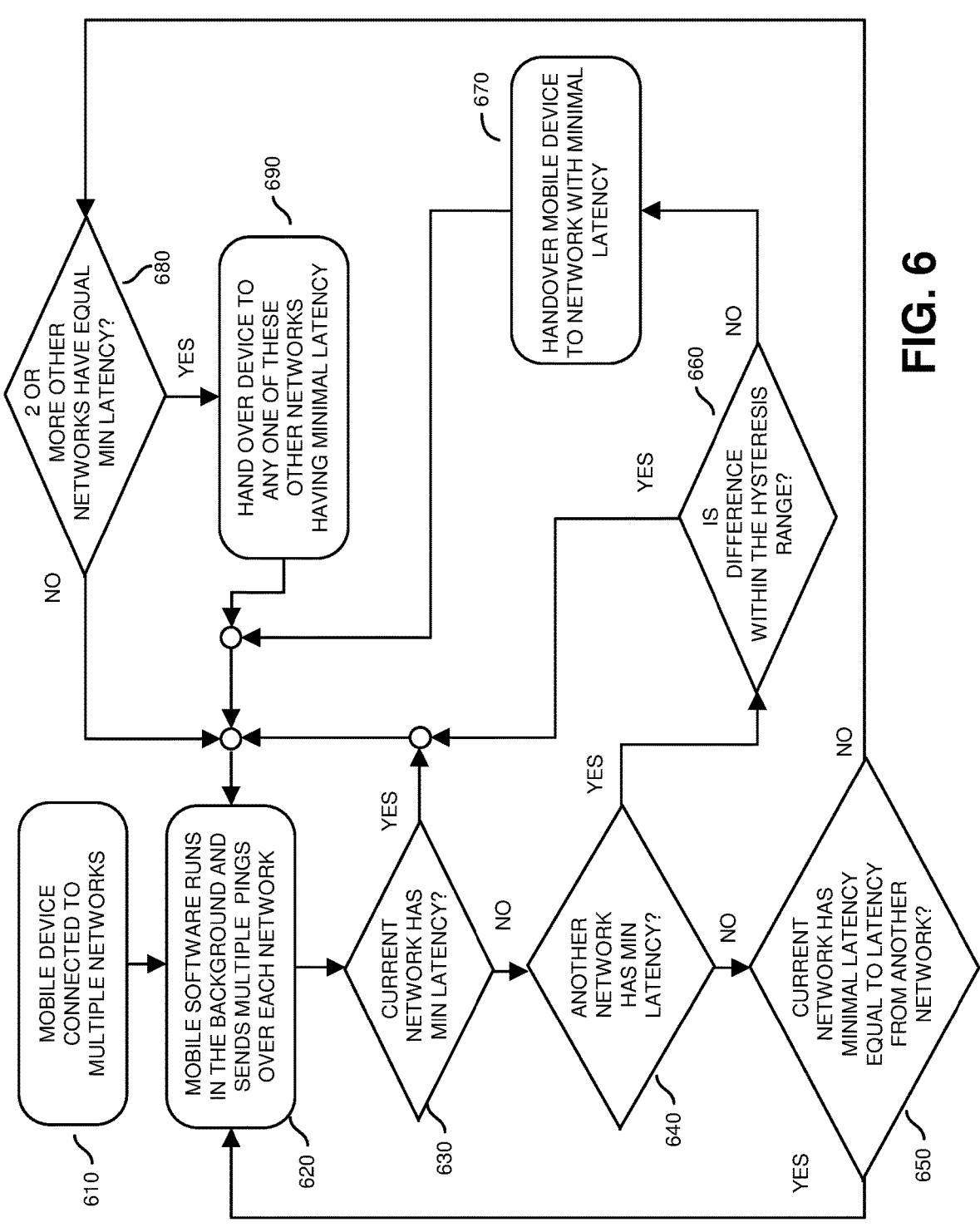
FIG. 6 is an example flow chart illustrating control of handoffs in a wireless network environment based upon latency according to embodiments herein.

FIG. 6 is an example flow chart illustrating control of handoffs in a wireless network environment based upon latency according to embodiments herein.

Initially, at processing operation 610 of flowchart 600, the communication management resource 145 operates the mobile communication device 110 to temporarily wirelessly connect to multiple wireless networks to determine latencies associated with communications to or from the remote management entity 140.

Note that the mobile communication device 110 can be configured to learn of the presence of the wireless networks in any suitable manner. In one embodiment, the wireless base stations in each of the wireless networks communicates a corresponding beacon indicating its identity and corresponding wireless network to which it belongs. The mobile communication device 110 and corresponding communication management resource 145 receives these beacons and can be configured to measure a wireless power level receiving such communications and decide amongst the different wireless base stations to which it will establish a respective wireless communication link. The mobile communication device 110 can be configured to select one or more of the wireless networks and corresponding wireless base stations from which one or more strongest wireless signals are received. Thus, the selection of a respective wireless network to provide conductivity to the remote management entity 140 can be based on the wireless power level of receiving communications from each of the different wireless networks and wireless base stations as well as measure latencies.

In processing operation 620, the mobile communication device executes communication management resource 145. The communication management resource 145 communicates pings over each of the candidate wireless communication links to test latency.

Further, in processing operation 630, the communication management resource 145 determines if the current selected wireless network supporting a corresponding primary (i.e., previously selected) wireless communication link to the remote management entity 140 provides the lowest latency. If so, processing continues at (loops back to) operation 620. Alternatively, if the communication management resource 145 determines that the current selected network and corresponding wireless communication link does not provide the minimum latency, the communication management resource executes operation 640.

In processing operation 640, the communication management resource 145 determines if another wireless network provides a lower latency to the mobile communication device 110 than the currently selected wireless network. If so, the communication management resource 145 executes processing operation 660 where the communication management resource 145 determines if the difference associated with the latencies is within a hysteresis range (threshold value amount). If the result of the processing operation 660 is yes, the communication management resource continues with executing processing operation 620. Alternatively, if the result of processing operation 660 is negative, the communication management resource 145 continues with executing processing operation 670, which includes a handoff of the mobile communication device to a network with the lowest detected latency. Subsequent to the handover, execution flow continues at processing operation 620 again.

Referring again to processing operation 640, if the communication management resource detects that there is no other network that provides a lower latency than the currently selected wireless network, the communication management resource 145 executes processing operation 650.

In processing operation 650, the communication management resource 145 determines if the current selected network has a minimal latency equal to a latency from another network. If so, the communication management resource 145 continues with processing operation 620 the communication management resource continues to use the current selected network to communicate with the remote management entity 140. Alternatively, if the current selected network does not have a minimal latency equal to latency of another network in processing operation 660, the communication management resource executes processing operation 680.

In processing operation 680, the communication management resource 145 determines if 2 or more other networks have equal minimum latency. If not, the communication management resource reverts (loops) to executing processing operation 620 again. Alternatively, the communication management resource 145 determines at processing operation 680 that two a more other networks have equal minimum latency. In response to this latter condition, the communication management resource 145 executes processing operation 690.

In processing operation 690, the communication management resource 145 hands over the mobile communication device 110 to any of the other wireless networks providing a minimal latency. Processing flow further continues at processing operation 620.

Thus, via execution of flowchart 600, while the mobile communication device 110 travels along a planned travel route such as pathway 101 through a geographical region, the communication management resource 145 or other suitable entity repeats operations of: i) determining a corresponding latency associated with conveyance of communications over multiple candidate wireless communication links associated with multiple nearby wireless base stations; and ii) based on the corresponding measured latencies, selects a wireless communication link from the multiple wireless communication links for communication of data from the mobile communication device 110 to the remote management entity 140.

Figure 7:
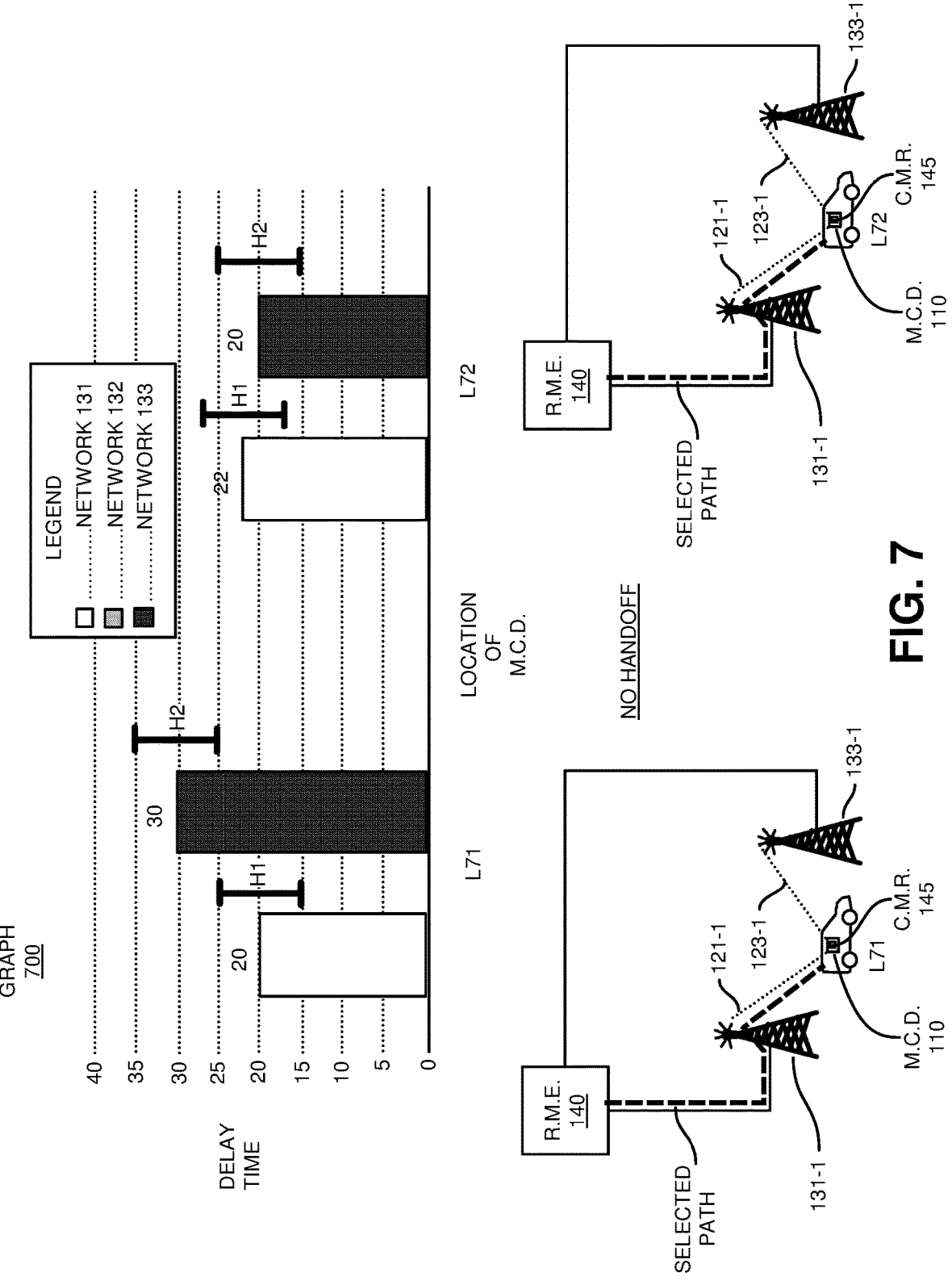
FIG. 7 is an example diagram illustrating implementation of latency hysteresis and prevention of a respective handoff from one wireless network to another according to embodiments herein.

FIG. 7 is an example diagram illustrating implementation of latency hysteresis and prevention of a respective handoff from one wireless network to another according to embodiments herein.

In this example embodiment, the communication management resource 145 implements hysteresis (such as hysteresis range H1 and hysteresis range H2) to determine whether to initiate a respective handoff from one wireless network to another wireless network providing access to remote management entity 140 while the mobile communication device 110 travels along the pathway 101.

For example, while at location L71, assume that the communication management resource 145 selects the first wireless network 131 to provide connectivity to the remote management entity 140 because the wireless network 131 provides a latency (delay time) of 20 milliseconds, which is less than the latency of 30 milliseconds provided by the wireless network 133.

As previously discussed, the communication device 110 continues to travel along the pathway 101 away location L71 to location L72. Thus, the vehicle 210 and corresponding mobile communication device 110 eventually reside at location L72.

While at location L72, in a manner as previously discussed, the communication management resource 145 communicates with one or more of the wireless networks and corresponding base stations to determine if any other candidate wireless networks provide a lower latency than the current selected wireless network 131 previously used at location L71.

While at location L72, assume that the communication management resource 145 determines that the wireless network 131 provides a latency of 22 milliseconds. Also, while at location L72, assume that the communication management resource 145 determines that the wireless network 133 provides a latency of 20 milliseconds. As previously discussed, to prevent needless ping-ponging between two different wireless networks along the pathway 101, the communication management resource 145 or other suitable entity implements hysteresis range H1 and/or hysteresis range H2 to determine whether or not to switch over to using a different wireless network.

For example, in one embodiment, each of the hysteresis range H1 and hysteresis range H2 is 10 milliseconds centered about the corresponding latency measurement value for a respective wireless network.

In order to initiate a respective handoff from one wireless network to another, hysteresis range H1 and hysteresis range H2 must not overlap. For example, the latency provided by the other wireless network must be better than the current selected wireless network by more than 10 milliseconds (or other suitable value) to initiate a switchover.

At location L72, the latency provided by the wireless network 133 is only better by 2 milliseconds than a latency associated with the wireless network 131. In such an instance, because the latency range H1 still overlaps with latency range H2 (the latency associated with the different wireless networks is substantially equal), the communication management resource 145 does not initiate a handoff of the primary wireless communication paths to the wireless network 133. In other words, there is not enough benefit of transitioning from the current selected wireless network 131 (providing 22 milliseconds latency) to the wireless network 133 (providing 20 milliseconds latency) because the decrease of latency by 2 milliseconds is less than a 10 milliseconds threshold associated with the combination of hysteresis range H1 and hysteresis range H2.

Thus, in one embodiment, the communication management resource 145 implements hysteresis (such as hysteresis ranges H1 and/or H2) to determine whether to switchover from using a first wireless communication link established with the first wireless network 131 to using a second wireless communication link established with the third wireless network to communicate with the remote management entity 140.

Figure 8:
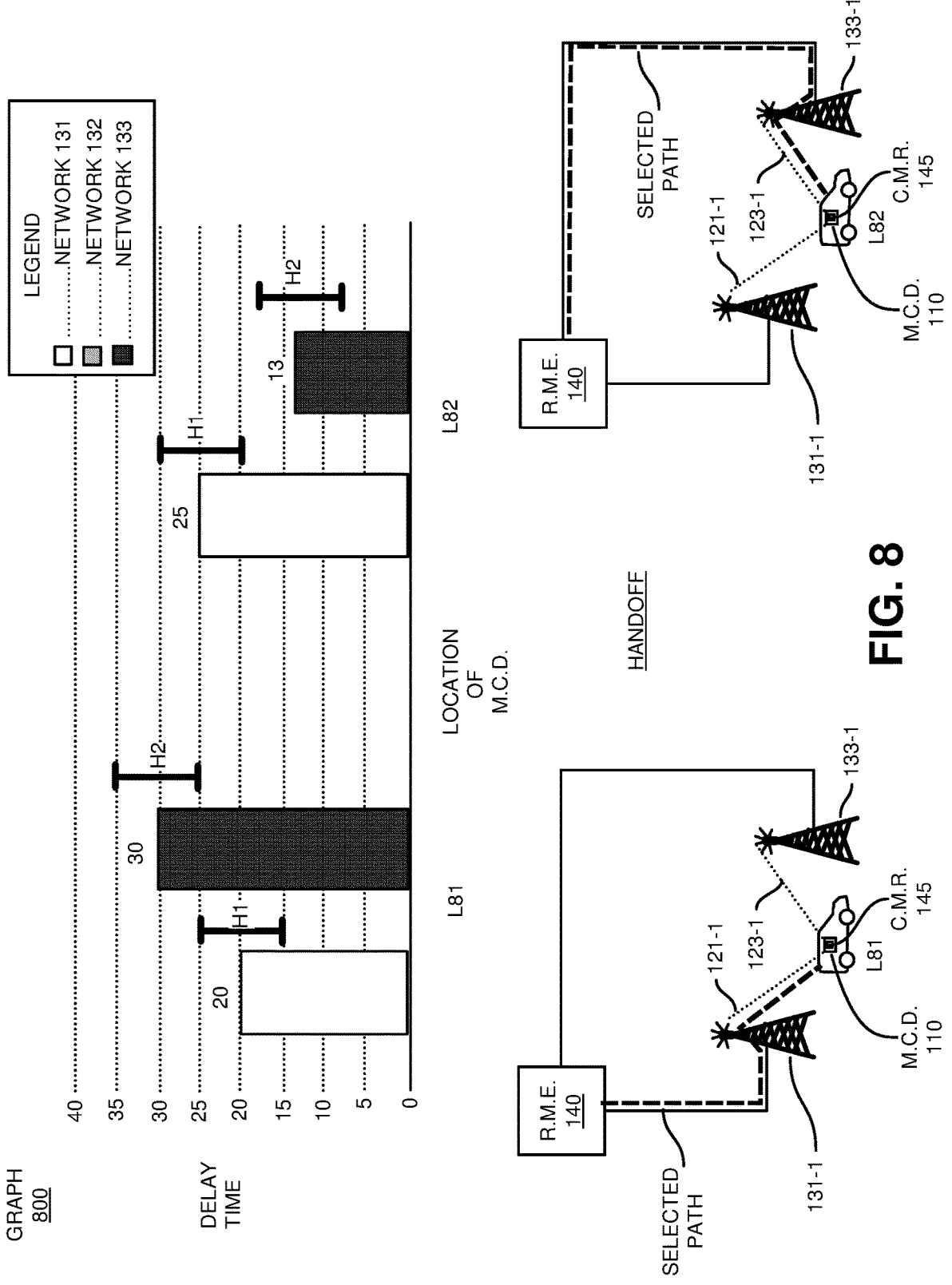
FIG. 8 is an example diagram illustrating implementation of latency hysteresis and handoff of a mobile communication device from one wireless network to another in response to detecting betterment of a latency greater than a threshold (hysteresis) amount according to embodiments herein.

FIG. 8 is an example diagram illustrating implementation of latency hysteresis and handoff of a mobile communication device from one wireless network to another in response to detecting betterment of a latency greater than a hysteresis threshold amount according to embodiments herein.

In this example embodiment, the communication management resource 145 implements hysteresis (such as hysteresis range H1 and hysteresis range H2) to determine whether to initiate a respective handoff from one wireless network to another wireless network providing access to remote management entity 140 while the mobile communication device 110 travels along the pathway 101.

For example, while at location L81, assume that the communication management resource 145 selects the first wireless network 131 to provide connectivity to the remote management entity 140 because the wireless network 131 provides a latency (delay time) of 20 milliseconds, which is less than the latency of 30 milliseconds provided by the wireless network 133.

As previously discussed, the communication device 110 continues to travel along the pathway 101 away from location L81 to location L82. Thus, the vehicle 210 and corresponding mobile communication device 110 eventually reside at location L82.

While at location L82, assume that the communication management resource 145 communicates with one or more of the wireless networks and corresponding base stations to determine if any other candidate wireless networks provide a lower latency than the current selected wireless network 131.

While at location L82, assume that the communication management resource 145 determines that the wireless network 131 provides a latency of 25 milliseconds. Also, while at location L82, assume that the communication management resource 145 determines that the wireless network 133 provides a latency of 13 milliseconds. As previously discussed, to prevent needless ping-ponging between two different wireless networks along the pathway 101, the communication management resource 145 or other suitable entity implements hysteresis range H1 and/or hysteresis range H2 to determine whether or not to switch over to using a different wireless network.

For example, in one embodiment, each of the hysteresis range H1 and hysteresis range H2 is 10 milliseconds centered about the corresponding latency measurement value for a respective wireless network.

In order to initiate a respective handoff from one wireless network to another, hysteresis range H1 and hysteresis range H2 must not overlap. For example, the latency provided by the other candidate wireless network must be better than the current selected wireless network by more than 10 milliseconds (or other suitable value) to initiate a switchover.

At location L82, the latency provided by the wireless network 133 is better by 12 milliseconds than a latency associated with the wireless network 131. In such an instance, because the latency range H1 does not overlap with latency range H2 (the latency associated with the different wireless networks is substantially different), and the wireless network 133 provides a lower latency with respect to wireless network 131, the communication management resource 145 does initiate a handoff of the primary wireless communication path (between the communication device 110 and the remote management entity 140) to the wireless network 133. In other words, there is sufficient benefit of transitioning from the current selected wireless network 131 (providing 13 milliseconds latency) to the wireless network 133 (providing 13 milliseconds latency) because the decrease of latency by 12 milliseconds is greater than a 10 milliseconds threshold associated with the combination of hysteresis range H1 and hysteresis range H2.

Thus, in one embodiment, the communication management resource 145 implements hysteresis (such as hysteresis ranges H1 and/or H2) to determine whether to switchover from using a first wireless communication link established with the first wireless network 131 to using a second wireless communication link established with the second wireless network to communicate with the remote management entity 140.

Figure 9:
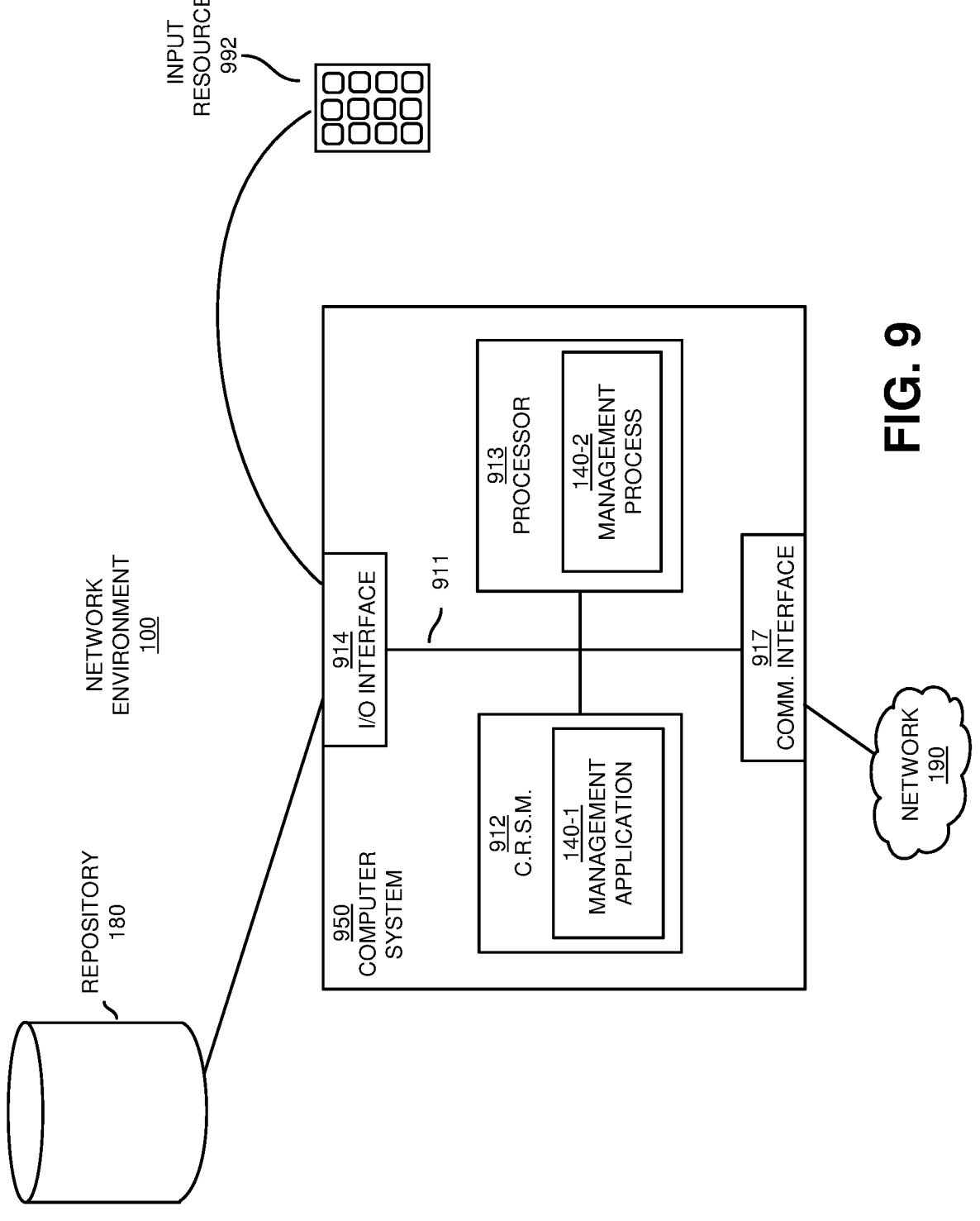
FIG. 9 is an example diagram illustrating example computer hardware and software operable to execute operations according to embodiments herein.

FIG. 9 is an example block diagram of a computer system for implementing any of the operations as previously discussed according to embodiments herein.

Note that any of the resources (such as communication management resource 145, remote management entity 140, etc.) as discussed herein can be configured to include computer processor hardware and/or corresponding executable instructions to carry out the different operations as discussed herein.

For example, as shown, computer system 950 of the present example includes interconnect 911 coupling computer readable storage media 912 such as a non-transitory type of media (which can be any suitable type of hardware storage medium in which digital information can be stored and or retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions associated with any entity as discussed herein) in a respective wireless station to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
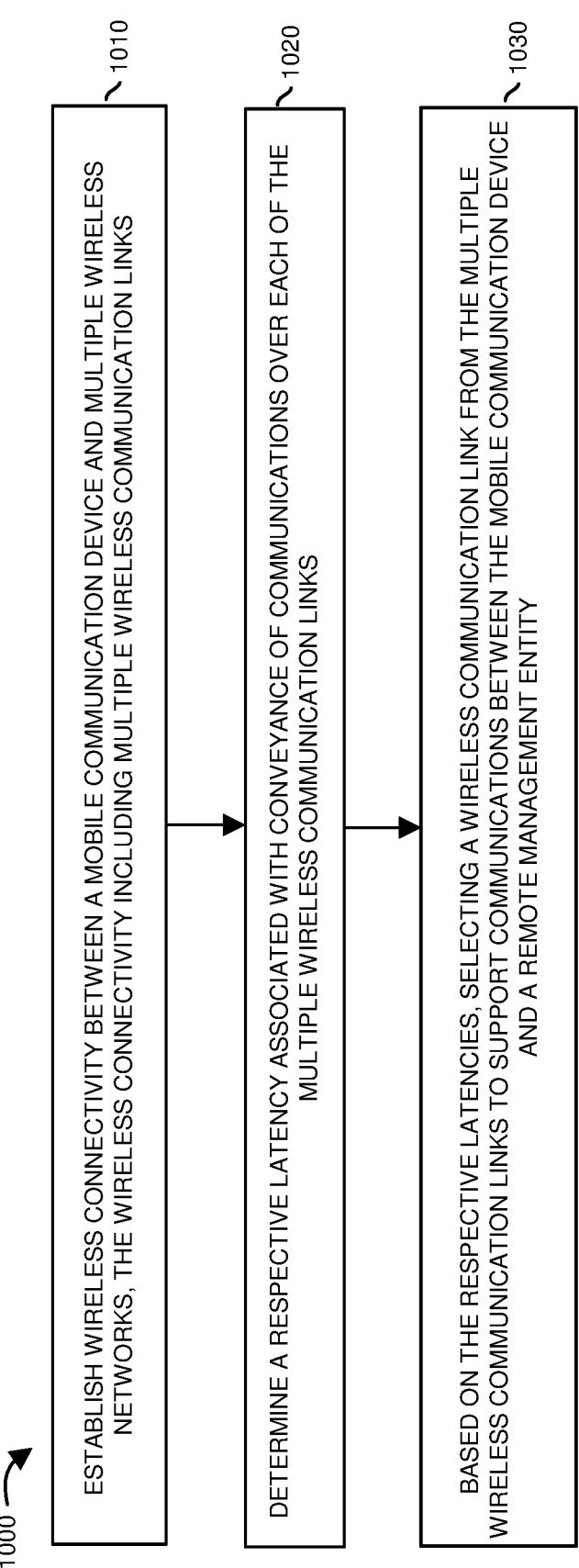
FIG. 10 is an example diagram illustrating a method according to embodiments herein.

FIG. 10 is a flowchart 1000 illustrating an example method according to embodiments herein. Note that there will be some overlap with respect to concepts as discussed above.

In processing operation 1010, the communication management resource 145 establishes wireless connectivity between a mobile communication device 110 and multiple wireless networks (131, 132, 133, etc.); the wireless connectivity includes multiple wireless communication links.

In processing operation 1020, the communication management resource 145 determines a respective latency associated with conveyance of communications over each of the multiple wireless communication links to a resource such as remote management entity 140, wireless base station, etc.

In processing operation 1030, based on the respective latencies, the communication management resource selects a wireless communication link from the multiple wireless communication links as a primary link to support communications between the mobile communication device 110 and the remote management entity 140.

Note again that techniques herein are well suited to facilitate processing of available physical infrastructure information and generation of a proposed wireless network installation plan for implementation of the new wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

establishing wireless connectivity between a mobile communication device and multiple wireless networks, the wireless connectivity including multiple wireless communication links, the multiple wireless communication links including a first wireless communication link and a second wireless communication link, the multiple wireless networks including a first wireless network and a second wireless network;

via test messages communicated from the mobile communication device over the multiple wireless communication links: i) producing a first latency value indicating a first latency associated with the mobile communication device communicating over the first wireless communication link and the first wireless network to a remote management entity, and ii) producing a second latency value indicating a second latency associated with the mobile communication device communicating over the second wireless communication link and the second wireless network to the remote management entity; and preventing handoff of the mobile communication device from the first wireless network to the second wireless network during a condition in which a magnitude of the second latency value is detected as being less than a magnitude of the first latency value.

2. The method as in claim 1, wherein the first wireless communication link supports first communications between the mobile communication device and the remote management entity; and wherein the second wireless communication link supports second communications between the mobile communication device and the remote management entity.

3. The method as in claim 1, wherein producing the first latency value includes: i) communicating a first communication from the mobile communication device to the remote management entity over the first wireless network; and ii) generating the first latency value to indicate a first time difference between the mobile communication device communicating the first communication and the remote management entity receiving the first communication; and wherein producing the second latency value includes: i) communicating a second communication from the mobile communication device to the remote management entity over the second wireless network; and ii) generating a second latency value indicating a second time difference between the mobile communication device communicating the second communication and the remote management entity receiving the second communication.

4. The method as in claim 1 further comprising:

determining a planned trajectory of travel associated with the mobile communication device through a geographical region; and selecting amongst the multiple wireless communication links based at least in part on anticipated wireless coverage of the multiple wireless networks and corresponding prior instances of latencies associated with communicating with the remote management entity over the multiple wireless networks along the planned trajectory through the geographical region.

5. The method as in claim 1 further comprising:

while the mobile communication device travels along a planned travel route through a geographical region, repeating operations of: i) determining a corresponding latency associated with conveyance of communications over the multiple wireless communication links; and ii) based on determined corresponding latencies, selecting a wireless communication link from the multiple wireless communication links for communication of data from the mobile communication device to the remote management entity.

6. The method as in claim 1 further comprising:

while the mobile communication device is at a first location of a planned travel route of the mobile communication device through a geographical region: communicating a message from the mobile communication device over the first wireless communication link and through the first wireless network to the remote management entity; and while the mobile communication device is at a second location of the planned route: in response to detecting that the second wireless network provides a lower latency than the first wireless network by greater than a threshold value, communicating data from the mobile communication device over the second wireless communication link and through the second wireless network to the remote management entity.

7. The method as in claim 1, wherein each of the multiple wireless networks is operated by a different wireless network service provider.

8. The method as in claim 1 further comprising:

switching over from communicating data from the mobile communication device over the first wireless network to the remote management entity to communicating data over the second wireless network to the remote management entity in response to detecting that a communication path through the second wireless network to the remote management entity provides a lower latency than the first wireless network.

9. The method as in claim 1 further comprising:

selecting a group of wireless networks amongst the multiple wireless networks that provide the lowest transmission latency in which to communicate data to the remote management entity; and establishing connectivity from the mobile communication device through each of the wireless networks in the group to the remote management entity.

10. The method as in claim 1 further comprising:

implementing hysteresis to determine whether to switchover from using the first wireless communication link established with the first wireless network to using the second wireless communication link established with the second wireless network to communicate with the remote management entity.

11. The method as in claim 1 further comprising:

controlling a time interval between performing testing latency associated with each of the multiple wireless networks based on a distance traveled by a vehicle in which the mobile communication device resides.

12. The method as in claim 1 further comprising:

adjusting a time interval between testing latency associated with each of the multiple wireless networks in response to detecting the mobile communication device being in an area where the multiple wireless networks are historically unreliable for providing wireless access.

13. The method as in claim 1 further comprising:

receiving a range value;

referencing the range value with respect to the first latency value; and wherein the condition includes the magnitude of the second latency value falling within the range value referenced with respect to the first latency value.

14. A system comprising:

communication management hardware operative to:

establish wireless connectivity between a mobile communication device and multiple wireless networks, the wireless connectivity including multiple wireless communication links, the multiple wireless communication links including a first wireless communication link and a second wireless communication link, the multiple wireless networks including a first wireless network and a second wireless network;

via test messages communicated from the mobile communication the multiple wireless communication links: i) produce a first latency value indicating a first latency associated with the mobile communication device communicating over the first wireless communication link and the first wireless network to a remote management entity, and ii) produce a second latency value indicating a second latency associated with the mobile communication device communicating over the second wireless communication link and the second wireless network to the remote management entity; and prevent handoff of the mobile communication device from the first wireless network to the second wireless network during a condition in which a magnitude of the second latency value is detected as being less than a magnitude of the first latency value.

15. The system as in claim 14, wherein the communication management hardware is further operative to:

establish the first wireless communication link with the first wireless network of the multiple wireless networks; and establish the second wireless communication link with the second wireless network of the multiple wireless networks.

16. The system as in claim 15, wherein the communication management hardware is further operative to:

communicate a first communication from the mobile communication device to the remote management entity over the first wireless network;

generate the first latency value to indicate a first time difference between the mobile communication device communicating the first communication and the remote management entity receiving the first communication;

communicate a second communication from the mobile communication device to the remote management entity over the second wireless network; and generate the second latency value to indicate a second time difference between the mobile communication device communicating the second communication and the remote management entity receiving the second communication.

17. The system as in claim 14, wherein the communication management hardware is further operative to:

determine a planned trajectory of travel associated with the mobile communication device through a geographical region; and select amongst the multiple wireless communication links based at least in part on anticipated wireless coverage of the multiple wireless networks and corresponding prior instances of latencies associated with communicating with the remote management entity over the multiple wireless networks along the planned trajectory through the geographical region.

18. The system as in claim 14, wherein the communication management hardware is further operative to:

while the mobile communication device travels along a planned travel route through a geographical region, repeating operations of: i) determine a corresponding latency associated with conveyance of communications over the multiple wireless communication links; and ii) based on determined corresponding latencies, select a wireless communication link from the multiple wireless communication links for communication of data from the mobile communication device to the remote management entity.

19. The system as in claim 14, wherein the communication management hardware is further operative to:

while the mobile communication device is at a first location of a planned travel route of the mobile communication device through a geographical region: communicate a message from the mobile communication device over the first wireless communication link and through a first wireless network to the remote management entity; and while the mobile communication device is at a second location of the planned route: in response to detecting that the second wireless network provides a lower latency than the first wireless network by greater than a threshold value, communicate data from the mobile communication device over the second wireless communication link and through the second wireless network to the remote management entity.

20. The system as in claim 14, wherein each of the multiple wireless networks is operated by a different wireless network service provider.

21. The system as in claim 14, wherein the communication management hardware is further operative to:

switch over from communicating data from the mobile communication device over the first wireless network to the remote management entity to communicating data over the second wireless network to the remote management entity in response to detecting that a communication path through the second wireless network to the remote management entity provides a lower latency than the first wireless network.

22. The system as in claim 14, wherein the communication management hardware is further operative to:

select a group of wireless networks amongst the multiple wireless networks that provide the lowest transmission latency in which to communicate data to the remote management entity; and establish connectivity from the mobile communication device through each of the wireless networks in the group to the remote management entity.

23. The system as in claim 14, wherein the communication management hardware is further operative to: implement hysteresis to determine whether to switchover from using the first wireless communication link established with the first wireless network to using the second wireless communication link established with the second wireless network to communicate with the remote management entity.

24. Computer-readable storage hardware having instructions stored thereon, the instructions, when carried out by computer processor hardware, cause the computer processor hardware to:

establish wireless connectivity between a mobile communication device and multiple wireless networks, the wireless connectivity including multiple wireless communication links, the multiple wireless communication links including a first wireless communication link and a second wireless communication link, the multiple wireless networks including a first wireless network and a second wireless network;

via test messages communicated from the mobile communication device over the multiple wireless communication links: i) produce a first latency value indicating a first latency associated with the mobile communication device communicating over the first wireless communication link and the first wireless network to a remote management entity, and ii) produce a second latency value indicating a second latency associated with the mobile communication device communicating over the second wireless communication link and the second wireless network to the remote management entity; and prevent handoff of the mobile communication device from the first wireless network to the second wireless network during a condition in which a magnitude of the second latency value is detected as being less than a magnitude of the first latency value.

25. A method comprising:

establishing wireless connectivity between a mobile communication device and multiple wireless networks, the wireless connectivity including multiple wireless communication links;

via test messages communicated from the mobile communication device over the multiple wireless communication links, determining a respective latency associated with conveyance of communications over each of the multiple wireless communication links to a remote management entity; and based on comparison of the respective latencies, selecting a wireless communication link from the multiple wireless communication links to convey communications between the mobile communication device and the remote management entity;

wherein the multiple wireless networks include a first wireless network and a second wireless network;

wherein the multiple wireless communication links include: i) a first wireless communication link between the mobile communication device and the first wireless network, and ii) a second wireless communication link between the mobile communication device and the second wireless network;

receiving a first latency value indicating a first latency associated with communicating over the first wireless communication link and the first wireless network to the remote management entity;

receiving a second latency value indicating a second latency associated with communicating over the second wireless communication link and the second wireless network to the remote management entity;

receiving a first range value associated with the first latency value;

referencing the first range value with respect to the first latency value;

receiving a second range value associated with the second latency value;

referencing the second range value with respect to the second latency value; and initiating handoff of the mobile communication device from the first wireless network to the second wireless network in response to detecting that: i) a magnitude of the second latency value is less than a magnitude of the first latency value, and ii) the second range referenced with respect to the second latency value and the first range value referenced with respect to the first latency value do not overlap with each other.

* * * * *